J. E. AMBROSE.

Lamp.

No. 1,900. Reissued March 14, 1865.

Witnesses.
C. O. Gordon
H. C. Gordon

Inventor
Joshua E. Ambrose

N. PETERS, Photo-Lithographer, Washington, D. C.

UNITED STATES PATENT OFFICE.

SARAH T. AMBROSE, ASSIGNEE OF JOSHUA E. AMBROSE, OF MIDDLETOWN NEW YORK.

IMPROVEMENT IN LAMPS.

Specification forming part of Letters Patent No. 32,110, dated April 23, 1861; Reissue No. 1,900, dated March 14, 1865.

*To all whom it may concern:*

Be it known that JOSHUA E. AMBROSE, of Middletown, in the county of Orange and State of New York, has invented, made, and applied to use certain new and useful Improvements in the Construction of Lamps; and I do declare the following to be a full, clear, and correct description of the same, reference being had to the accompanying drawings, making part of this specification, and to the letters of reference marked thereon, in which—

Figure 1:
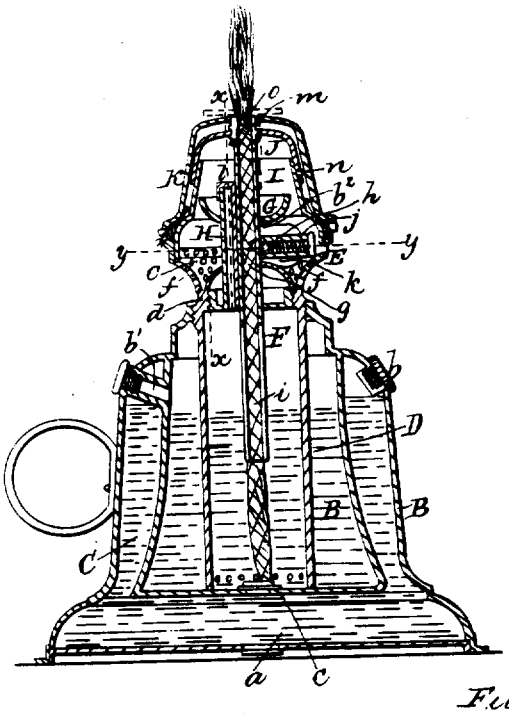
Figure 2:
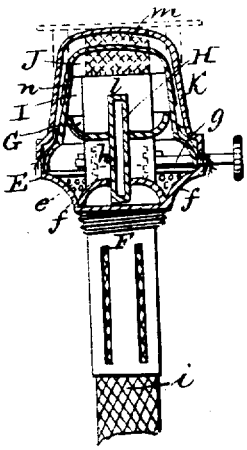
Figure 9:
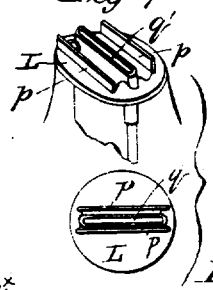
Figure 10:
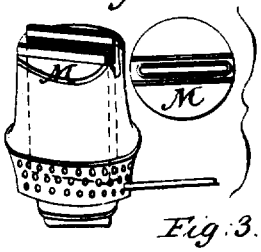
Figure 8:
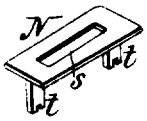
Figure 6:
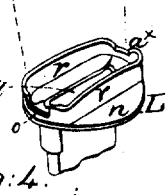
Figure 7:
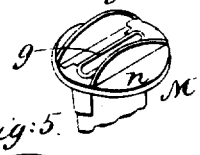
Figure 3:
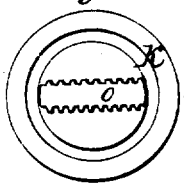
Figure 4:
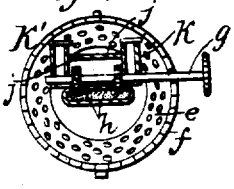
Figure 5:
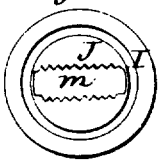

Figure 1 is a vertical central section of his improved lamp; Fig. 2, a vertical section of the burner of the same, taken in the line *x x*, Fig. 1; Fig. 3, a plan or top view of the inner cone or deflector; Fig. 4, a horizontal section of the burner, taken in the line *y y*, Fig. 1; Fig. 5, a plan or top view of the inner cone; Figs. 6, 7, 9, and 10, views of the deflecting-plates employed by him; Fig. 8, a detached perspective view of the purifying apparatus.

In the drawings like parts of the invention are indicated by the same letters of reference.

The nature of his invention consists in the construction (as hereinafter more fully set forth) of a new and improved lamp for burning paraffine and the various coal-oils in use.

The object of the invention is to obtain a lamp which will burn the materials above specified without a chimney, and one which is portable or may be used as a hand-lamp, and carried while burning from place to place without smoking.

To enable those skilled in the arts to make and use my invention, I will speak of its construction and operation.

A shows the body or fountain of the lamp, formed of metal or other suitable material, and encompassed by a jacket, B, which forms a water-chamber, C, all around the sides and bottom of the body A, in which the oil or paraffine to be burned is placed. The chamber C is provided with an escape or discharge plug, *a*, at its bottom, and also with the supply-plug *b* at its upper part. The bottom of the body A is also provided with a plug, *c*, the use of which will be hereinafter described. The body A is also provided with the supply-tube *b'*. The orifice of the body A has the upper end of a tube, D, secured into it—that is to say, when a small burner is to be employed. This tube D extends down to the bottom of the body A, and is perforated at its lower end to afford communication between the body A and the interior of the tube D. The upper end of the tube D has a screw-thread, *d*, cut upon its inner side to receive the screw of the burner E, the shell *e* of which is perforated, as shown at *f*, to admit the external air.

F is the wick-tube, fitted centrally in the shell *e*, extending some distance above and below it. In the shell *e* there is fitted horizontally the shaft *g*, provided with the spur-wheels *h*, which spur-wheels *h* engage the wick *i* in the wick-tube F, the spur-wheels *h* passing through slots in the wick-tube F for this purpose. The shaft *g* is fitted in tubular bearings *j*, which have spiral springs *k* in them, said springs *k* acting against the shaft *g* and keeping the wheels *h* engaged with the wick, and at the same time allowing the wheels *h* to yield to any inequalities of the wick. This arrangement prevents the wheels *h* from becoming loose on their shaft *g*, and also prevents any undue pressure of the wheels against the wick, at the same time insuring a sufficient pressure to cause the wick to be raised and lowered.

On the wick-tube F there is placed a basin or cup, G, and to the side of the wick-tube F there is attached a small cylindrical tube, H, which extends down through the bottom of the burner and communicates with the interior of the body or fountain A of the lamp, and extends upward nearly to the top of the wick-tube and has its upper end covered with wire-cloth *l*.

I is a conical tube fitted on the shell *e* and extending upward to a level with the top of the wick-tube. The upper perforations of the shell *e* are above the base of this tube I.

On the top of the conical tube I there is placed a dome-shaped cap or deflector, J, having a slot, *m*, in its upper end, with serrated edges, (shown clearly in Fig. 5,) and around the tube I and concentric with it there is placed a cone or deflector, K, the base of which is attached to the shell *e*, and a space, *n*, is allowed between the cone K and the tube I. The top of the cone K is provided with the slot *o*, notched at its edges, as seen in Fig. 3.

L and M show two deflectors, placed on the top of the wick-tube F when necessary to use them. These deflectors are simply horizontal plates *p*, slotted at *q*, and having flanges *r* around their slots or openings. The deflector M has open ends, but the deflector L has partially-closed ends with flaring jaws $a^x$.

N is a flat metal plate having an oblong slot, *s*, through its center, corresponding in size to a transverse section of the wick-tube, so that the top of the wick-tube may fit in the slot *s*. The plate N is provided with pendants, *t*, one near each end.

When paraffine or heavy oils are to be used, the chamber C is supplied with warm water, which keeps the paraffine or oil in a proper fluid state, and in burning oils of light grade, when warm water is not required, the plug *c* in the body A of the lamp may be withdrawn and the water will keep the oil in the body A pressed up toward the burner. The oil, in consequence of being specifically lighter than the water, will float on the top of the latter in the body or fountain A. The lamp is thereby prevented from exploding from the pressure of gas within—a contingency of frequent occurrence in burning volatile hydrocarbons.

In burning paraffine or heavy oils which require to be warmed in order to be sufficiently fluid to burn readily, a small quantity of paraffine is placed in the cup G, which, being near the flame, soon melts, drops through the openings $b^x$, and saturates the wick *i*, so that the lamp will burn at once or before the material in the body or fountain A is warmed.

By having the cone or deflector K and tube I, with its cap J, arranged as shown, the air is brought into direct contact with the base of the flame, and air is allowed to pass up through the serrated or notched edges of their slots *m o* and come in contact with the flame, and a series of quick currents are produced, the notches dividing the general upward current and causing the air to impinge against the whole surface or area of the flame. This arrangement effectually prevents the flame being affected by an upward movement of the lamp, as the strong upward draft prevents the flame being affected by the resistance of the air. As the lamp is moved upward a steady flame is therefore obtained. The top of the wick *i* projects through the slot *m* of the cap J, so that the base of the flame will be between the cap J and the cone K.

The peculiar value of the deflectors L and M consists in the flanges *r* extending upward. These plates when placed over the wick-tube I may be slipped down upon the wick-tube until the upper edges of the flanges *r* are level with the top of the wick-tube. In this position of the deflector two currents of air are conducted by the flanges to the base of the flame each side of the wick-tube I. The heat also imparted to these flanges by the flame renders the combustion much more perfect. When the flanges are level with the top of the wick-tube, the plate *p*, from which they arise, is below the top of the wick-tube. This plate *p*, extending on each side of the wick-tube, causes a portion of the air in its upward current to be diverted from the direction it would otherwise take and to meet the flame above the flange *r*. This arrangement of the flanges *r* is very important for spreading the flame and rendering the combustion perfect when used in combination with the cone K. The plates L and M may be raised so that the flanges with their upper edges are above the end of the wick-tube, and the beneficial effect will be increased, instead of being diminished. When the flanges are elevated above the end of the wick-tube, the flame extends out to these flanges, burning over them, thus increasing the intensity of the heat, which is so essential to perfect combustion, as the air and the currents of air ascend directly under the flame, which extends beyond the wick to these flanges. This combined result produces a pure flame, whether the deflecting-plates be used in connection with the cone K or without the cone K, and in combination with the tube I, or each separately, with the wick-tube. It will be observed that the edges of the flanges in the deflecting-plate L are level. This shape is more valuable than the oval shape given to the flanges of the deflecting-plate M or of the cap J. If the deflecting-plate L be used in connection with the cone K and placed over the wick-tube, the flame burns directly over the upper edges of the flanges, the same at the ends of the flanges as in the center, making the combustion as perfect at the edges of the flame as in the center of the flame; but in the case of the deflecting-plate M and the cap J, the center of the plate and of the cap is higher, and the heat is more intense at this point than at the edges of the flame, thus producing a perfect combustion in the center, but an imperfect combustion at the edges.

What has just been said of the deflecting-plate L when used in combination with the cone K will be found equally true when the same shall be used independently of the cone K and in combination with the wick-tube. It will also be observed that the cone K and cap J are so arranged that when placed in their proper positions they bring the upper end of the wick between the cap J and cone K, the base of the flame being between the two caps. This space between the two caps may properly be termed an "air-and-heat chamber," in which the process of combustion is going on while the lamp is burning. It will also be observed that the slot *m* of the cap J is made narrow, so that the flame which burns above cannot extend below the cap and touch the wick-tube, except upon the edges of the tube. This is a very important point in the construction of the cap J or deflecting-plates L and M, whether the same be used in combination with the cone K or separately in combination with the wick-tube F, or in combination with the wick-tube F and

BEST AVAILABLE C tube I. When the deflecting-plates L and M have their slots narrowed, (see Figs. 9 and 10,) as in the case of the cap J, the base of the flame is above them and under the cone K, as shown in Fig. 1. When the deflecting plates L and M and cap J are used in combination with the wick-tube, and the slots in the deflecting plates are narrowed to correspond with the slot in cap J, the flame will burn entirely above the deflecting plates L and M and cap J, except at the edges. This is of great importance in the construction of a burner for a lamp burning hydrocarbon oils without employing a chimney, as by this arrangement the danger resulting from heating the wick tube is obviated and a more perfect combustion is obtained.

The deflecting plates L and M, when constructed as described and used in combination with the wick-tube, serve as good burners for burning hydrocarbon oils without the employment of a chimney. The tube I, when combined with the deflecting plates, adds materially to their value in some cases.

The deflecting-plates may be attached to the wick-tube or rest upon tube I, or the tube I and the deflecting-plates may be made in one piece, (see Fig. 10,) or may be attached to the cone K, or arranged in any convenient way over the wick-tube. The tube D serves as a chamber to retain the oil around the wick-tube and prevent it from being unduly agitated around the wick-tube when the lamp is moved. It also admits by its removal of a larger burner being inserted in the lamp. When it is necessary to snuff the lamp or to trim the wick, the metal plate N is adjusted to the cone K, the top of the wick passed through the slot *s*, and the wick trimmed off or cut flush with plate N.

In Figs. 1 and 2, the plate N is shown in red, adjusted to the burner, the pendants *t* resting on the ends of the slot *o* of the cone K.

Having thus described the invention, what is claimed as new therein, and desired to be secured by Letters Patent, is—

1 The use or employment of the water-chamber C, communicating through a stoppered opening with the body or fountain A of the lamp, and arranged to operate substantially as and for the purpose set forth.

2. The arrangement of the springs *k*, shaft *g*, and wheels *h*, substantially as shown for elevating and lowering the wick, as described.

3. In combination with the cone K, the short tube I, for the attachment of movable inner deflecting-plates, for the purpose specified.

4. The plate N, constructed as shown and operating with the outer cone, K, for the purpose described.

5. Providing the deflecting-plates L and M with the flanges, as described, and combining either of them with the wick-tube F, for the purpose specified.

6. The use or employment of either of the deflecting-plates L and M, having flanges constructed as described, in combination with the wick-tube F and tube I, for the purpose set forth.

7. Arranging and combining the cone K, cap J, and either of deflecting-plates L and M, so that the base of the flame shall be brought between the two deflectors, for the purpose herein described.

8. Making the slots of the deflecting-plates L and M and of the cap J narrow, for the purpose described.

9. In combination with the wick-tube F and cone K, the use or employment of either of the deflecting-plates L and M or cap J, as shown, for the purpose specified.

SARAH T. AMBROSE.

Witnesses:
B. N. CLEVELAND,
W. J. BOGGS.